United States Patent [19]

Kirsch

[11] Patent Number: 5,431,232
[45] Date of Patent: Jul. 11, 1995

[54] QUICK CHANGE MOUNTED PACKER SYSTEM

[75] Inventor: Jason R. Kirsch, St. Brieux, Canada

[73] Assignee: F. P. Bourgault Industries Cultivator Division Ltd., St. Brieux, Canada

[21] Appl. No.: 143,647

[22] Filed: Nov. 1, 1993

[51] Int. Cl.6 .............................................. A01B 31/00
[52] U.S. Cl. ................................... 172/438; 111/197; 111/130
[58] Field of Search ............... 172/249, 250, 251, 253, 172/136, 174, 175, 195, 196, 197, 199, 200, 438, 684.5; 111/52, 193, 197, 198

[56] References Cited

U.S. PATENT DOCUMENTS

| | | | |
|---|---|---|---|
| 969,613 | 9/1910 | Ferris | 172/174 |
| 3,052,306 | 9/1962 | Lynch | 172/174 X |
| 4,189,008 | 2/1980 | Porter | 172/253 |
| 4,333,534 | 6/1982 | Swanson et al. | 111/52 X |
| 4,429,750 | 2/1984 | Pope | 172/253 |
| 4,506,904 | 3/1985 | Kinzenbaw | 172/248 |
| 4,539,921 | 9/1985 | Morlock | 172/253 X |
| 5,080,178 | 1/1992 | Dietrich, Sr. | 172/153 |

Primary Examiner—Randolph A. Reese
Assistant Examiner—Robert Pezzuto
Attorney, Agent, or Firm—Fisher, Christen & Sabol

[57] ABSTRACT

A cultivator is equipped with detachable harrows or detachable packers. When the cultivator is used for direct seeding, narrow openers cut through the earth, and seed pneumatically transported from an air seeder, is placed immediately behind the openers. Thereafter a series of packers, mounted to the rear of the cultivator, pack the seed. Spring tensioned support arms support the packers or harrows. Through various adjustments, these support arms can generate packing pressures from 0.5 psi to 3.5 psi, depending upon soil conditions. The same implement with the narrow openers and packers removed can be equipped with sweeps and mounted harrows to act as a general soil preparation device. When the harrows are mounted for field operation the adjustable spring tensioned support arms are adjusted to relax downward pressure. The unit as a whole, therefore, serves as a seeding or general tillage device, saving the operator extensive capital costs in farm machinery.

20 Claims, 8 Drawing Sheets

QUICK CHANGE MOUNTED PACKER SYSTEM

This invention relates to combination tillage and seeding equipment and more particularly, to a cultivator using quick change mounted packers or harrows, depending upon the operation.

BACKGROUND

Traditionally, grain farmers have used a number of implements to prepare the soil and seed the crop. Generally a grain farmer passes the land once with a cultivator equipped with harrows to till the land. Thereafter, the farmer changes equipment and passes the land again, using an air hoe drill equipped with an air seeder machine. Thus, it has been necessary to make at least two passes over the land.

As soil conservation practices become more popular in several areas, a need has developed for an implement which can cut furrows, seed, fertilize and cover the seed in one pass. No-till or zero-till direct seeding is accomplished by a cultivator equipped with narrow openers, and a means to convey seed and fertilizer pneumatically behind the openers, followed by a series of packers. However, certain conditions of the soil and certain crops do no permit this type of seeding. For example, when there are many weeds on the land, a cultivator must be equipped with sweeps which completely cultivate the land, followed by harrows, and the application of seed and fertilizer. Finally, the soil is packed with coil packers. This type of seeding is termed direct seeding but is not considered no-till. At other times an operator may wish simply to do general tillage of the land, and this can be accomplished with the use of a cultivator equipped with sweeps, and harrows following behind. If the land is to be seeded later, an air hoe drill or other seeding device is pulled over the field.

In light of the foregoing, there has become a need to have one implement which can function interchangeably as a direct seeder or a cultivator. Thus there has developed a need to have a cultivator which, when equipped with harrows, performs the total tillage requirements. When the same cultivator is equipped with narrow openers, mounted packers, and an air seeder, it serves as a one pass direct seeding operation with on-row packing. In order to accomplish this dual function a need has arisen to have a quick means of interchanging harrow assemblies with packer assemblies. The applicant of the present invention has developed a quick change mounting bracket which, with the insertion or removal of a single pin, allows harrow assemblies or packer assemblies to be quickly mounted to the rear of a cultivator to perform the different tasks, i.e. direct seeding with on-row packing, direct seeding with sweeps and mounted harrows to kill weeds during seeding, or general tillage.

If harrows are used while direct seeding, a further implement known as a coiled packer can be attached to the rear of the cultivator and towed behind the harrows.

One of the problems encountered, however, with attempting to use harrows or packers on the same implement is that packers need a downward force more than double that of harrows. If packers do not have a sufficient downward force to secure the seed into the soil, poor germination will result. Research has shown that packing pressures from 0.5 pounds per square inch to 5 pounds per square inch consistently give the best crop emergence results.

Packing pressures must also be varied according to the type of soil or moisture conditions. The problems of over compaction of clay soils manifest in two ways; 1) the packer wheel tracks will become smeared or glazed over so that when the soil dries, it bakes too hard to allow normal plant emergence; 2) over compaction also causes soil moisture to be lost through evaporation and the result is a crack in the bottom of a packer wheel track. Once the crack commences the rate of moisture loss increases significantly so that the area around the seed dries out before germination occurs. To prevent moisture loss through capillary action, it is recommended that the soil density above the seed be lower than the soil density below the seed. Thus a need exists to select a correct packing pressure to avoid crop emergence problems.

On the other hand, if harrows are employed with the same downward force as when packers are used, they will become clogged with the left over stubble or straw in the field.

It is therefore, an object of the present invention to provide a combination cultivator/seeder device equipped with easily connected changeable harrows or packers with an adjustment mechanism which can appropriately vary the downward force on said harrows or packers.

It is a further object of the present invention to provide a combination farm implement adaptable for seeding or complete tillage ability.

SUMMARY OF INVENTION

Therefore, this invention seeks to provide a combination farm implement for seeding or general tillage adapted to be pulled by a power source comprising: a cultivator including a plurality of furrow forming openers, said openers extending downwardly from a frame; said frame being supported by a plurality of wheels; said frame and said openers being adapted to be raised or lowered by hydraulic means; said cultivator further comprising a plurality of rearwardly extending support arms pivotally mounted to support brackets fixedly mounted to the rear of said frame; each of said support brackets at its upper end being adapted to fixedly retain a variable tension rate spring rod; each of said support arms including a mounting plate at its remote end; said variable tension rate spring rod being pivotally connected at its opposite end to an adjustment lever; said adjustment lever being pivotally mounted to an adjustment bracket; said adjustment bracket being fixedly mounted near the remote end of said support arm and comprising a plurality of spaced apart adjustment holes adapted to engage an adjustment pin; said implement further comprising a plurality of soil working assemblies; each of said soil working assemblies being adapted to detachably connect to said mounting plate at the remote end of each of said support arms; and wherein in operation, depending upon the type of soil conditions and soil working assemblies, the downward pressure exerted upon said soil working assemblies can be increased or decreased by moving said adjustment lever rearwardly or forwardly, respectively, and inserting a pin in an adjacent adjustment hole in said adjustment bracket.

The present invention gives a cultivator a dual purpose role. When equipped with harrows the implement functions as a cultivator and when equipped with narrow openers and mounted packers, its role parallels that of a hoe drill. This combination system makes very efficient use of a cultivator. A new quick attach and detach bracket allows for convenient changeover from harrows to packers.

In order to produce sufficient downward force on the packers and still allow for deflection, two springs, stacked back to back or in parallel, are used in association with a support arm on which the quick attach and detach bracket is mounted. A small spring has a spring rate of 400 pounds per square inch, and a large spring has a spring rate of 500 pounds per square inch. The effective rate of the two springs combined is 222 pounds per inch. After the small spring bottoms out, the rate becomes that of the larger spring. The mounted packer system of the present invention can generate packing pressures adjustable from 0.5 psi to 3.5 psi. Alternatively, one can employ a single spring having a variable pitch to the coils to produce two different deflection rates.

In operation, as the cultivator shanks sink further into the soil, there is a need for the packer wheels to lower accordingly. Without the spring system, the packers stay on top of the ground due to their light weight; the packers being constructed of polyethylene.

Since the springs of the present invention adapted to produce the downward force are in parallel, the combined rate is $1/R1 + 1/R2 = 1/Rt$, or $1/400$ psi $+ 1/500$ psi $= 1/222$ psi. The small spring will deflect 1 inch until totally compressed and then the 500 pound spring deflects 0.8 inch relative to the small spring for a total of 1.8 inch deflection at 222 psi; then the deflection rate changes to 500 psi.

A variable tension rate spring rod retains the two springs and is attached to a spring retention bracket fixed to a rear cross bar of the cultivator frame. A cultivator support arm is pivoted to the spring retention bracket. Near the rear of the cultivator support arm is a downward force adjustment bracket having a plurality of holes. Pivotally mounted to the adjustment bracket and pivotally mounted to the variable tension rate spring rod is a downward force adjustment lever.

When the adjustment lever is moved rearwardly, tension on the spring is increased forcing the remote end of the cultivator support arm to pivot downwardly and increase the downward force exerted by the packers or harrows, whichever is mounted thereon. Conversely a forward movement of the adjustment lever releases the tension, allowing the packers to lift the remote end of the support arm upwardly, thus decreasing the packing pressure.

BRIEF DESCRIPTION OF THE DRAWINGS

A preferred embodiment of the invention will be more clearly described in conjunction with the following drawings wherein.

DETAILED DESCRIPTION OF THE INVENTION

Figure 1:
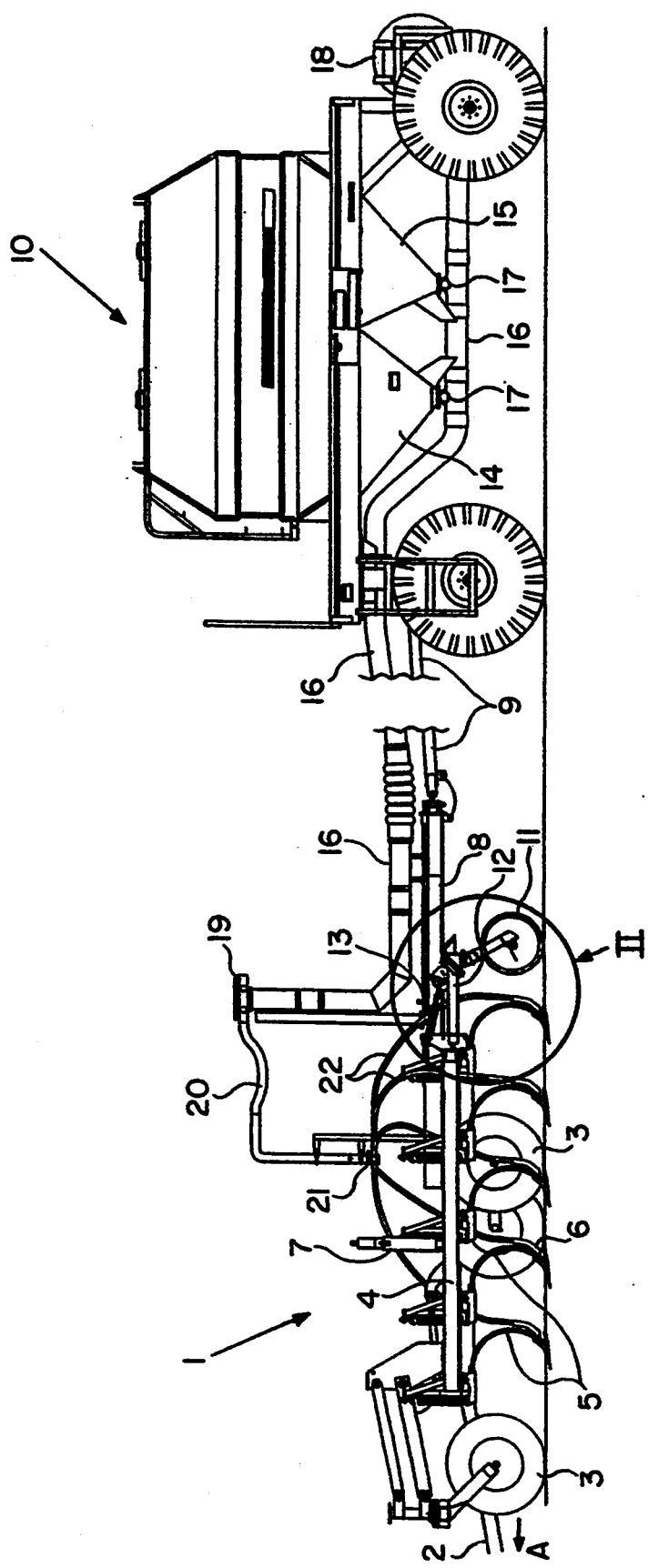
FIG. 1 is a side view of a cultivator with mounted packers and an air seeder.

In FIG. 1, a cultivator shown generally as 1, is equipped with a front hitch 2 which is designed to be connected to a power source (not shown) to tow the cultivator in a direction marked as A. The cultivator frame 4 is supported by large wheels 3. Extending downwardly below the frame, are a plurality of shanks with narrow soil furrow openers or sweeps 5. Cultivator 1, as shown in FIG. 1, is equipped with a plurality of seed boots 6, one of which is attached behind each of the shanks of the narrow soil furrow openers and sweeps. The frame and the openers can be moved downwardly into the soil relative to the wheels 3 by means of hydraulic cylinders 7. The upward or downward adjustment of the openers, or sweeps, will depend on the hardness and type of soil being tilled.

The cultivator is also equipped with a rear hitch 8 which is adapted to be coupled to a front hitch 9 of a known air seeder 10.

Figure 2:
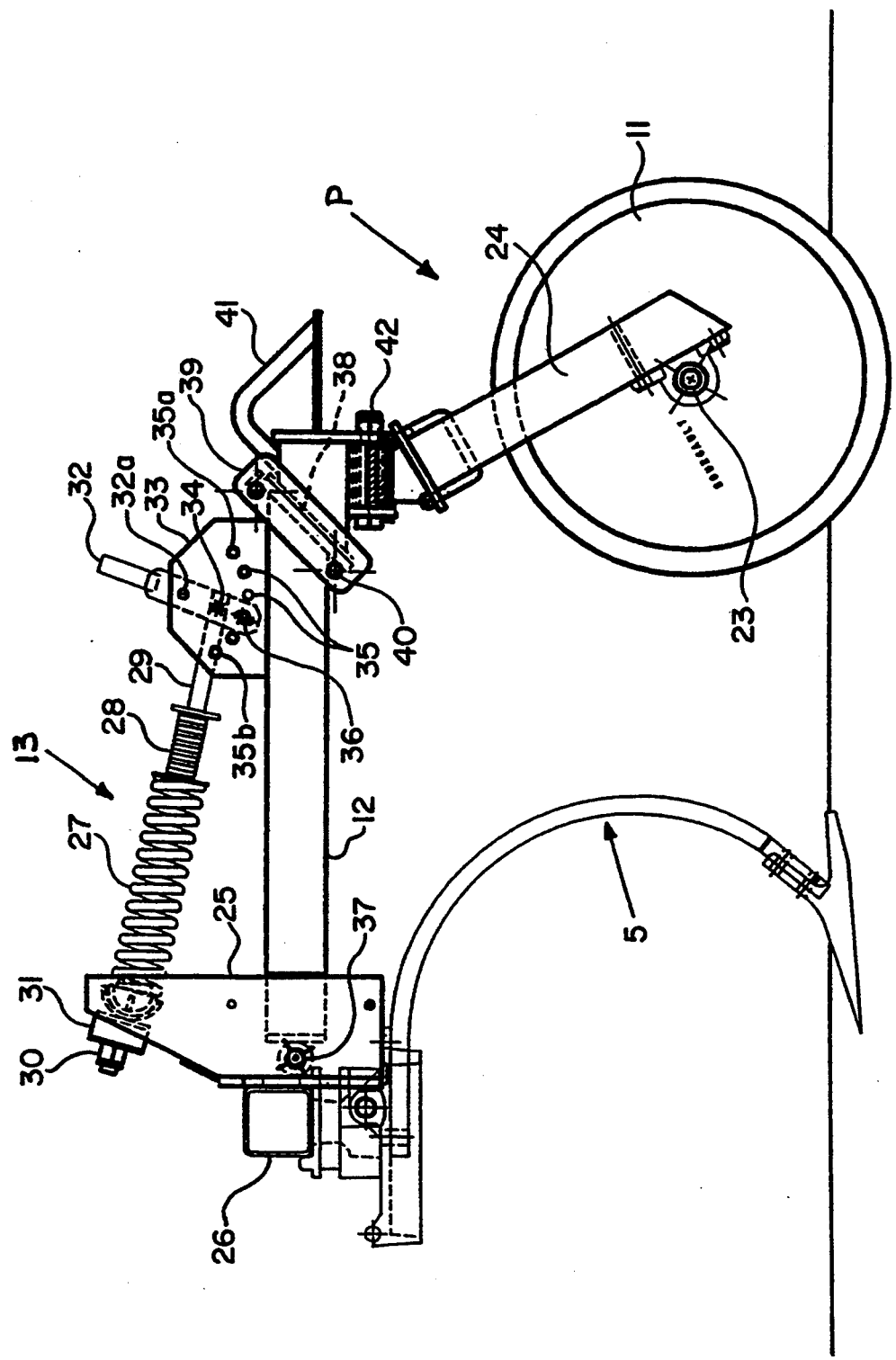
FIG. 2 is a side view of the portion of the cultivator shown generally as II.

Extending rearwardly from the cultivator 1 are a plurality of in-line packers shown as 11. The packer assemblies are detachably mounted to cultivator support arms 12 which are pivotally mounted to brackets 25 (as shown in FIG. 2) fixedly attached at the rear of the cultivator frame 4 and equipped with adjustable tensioned spring assemblies 13. The area shown as II, which is the subject matter of the present invention, will be discussed in further detail in conjunction with other drawings.

The air seeder 10 is equipped with a fertilizer bin 14 and a seed bin 15. Seed and fertilizer are metered into the principal air stream 16 by means of metering augers 17. The seed and fertilizer are pneumatically conveyed along the principal air stream 16 by means of a centrifugal blower 18. The seed and fertilizer are conveyed through a primary manifold 19 where the seed and fertilizer are then distributed to secondary transfer lines 20 to a plurality of secondary manifolds 21. Thereafter the seed and fertilizer are blown through tertiary feed lines 22 which lead directly to seed boots 6.

Figure 3:
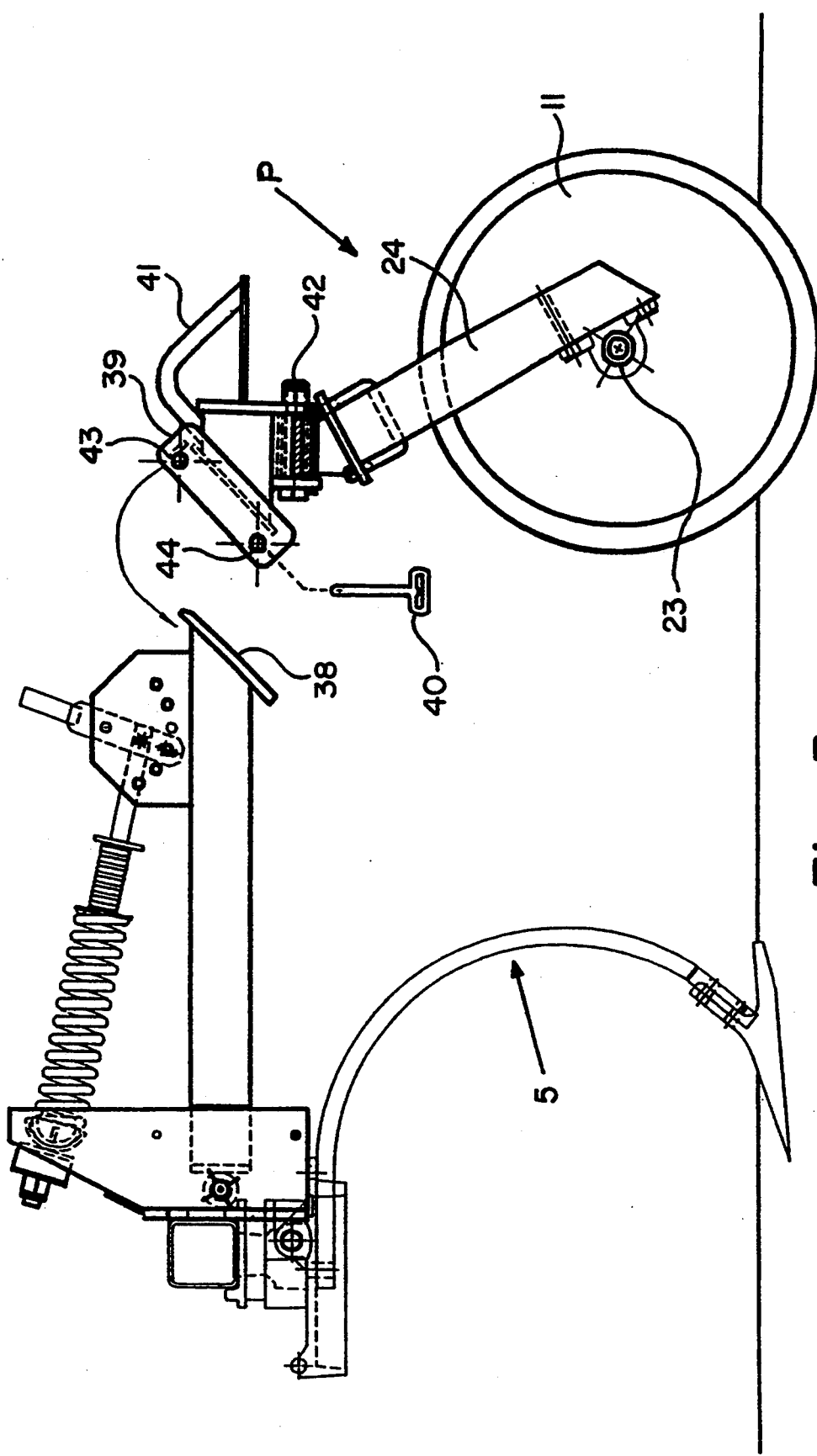
FIG. 3 is the same view as FIG. 2 with the packer detached.

The area shown as II in FIG. 1 is shown in greater detail in FIGS. 2 and 3. The packers 11 are mounted on an axle 23 which is connected to a C-shaped yoke 24. Spring retention bracket 25 is fixedly mounted to a cultivator frame cross member 26 which is located at the rear of the cultivator. Tensioned spring assembly, shown generally as 13, is comprised of a primary tensioned spring 27 and a secondary tensioned spring 28 which are both mounted on variable tension rate spring rod 29. Spring rod 29 is fastened to the upper portion of bracket 25 by means of spring rod nut 30. An optional split ring tension block or spacer 31 is optionally added in order to keep cultivator support arm 12 in a position closer to the horizontal. This is necessary for transport purposes in order to keep the packers 11 from becoming damaged on the roadway.

The rear end of variable tension rate spring rod 29 is pivotally attached to a downward force adjustment lever 32 at pivot point 34. Downward force adjustment lever 32 is pivotally attached at point 32a to adjustment bracket 33. Adjustment bracket 33 is equipped with a number of apertures 35 which are adapted for engagement with a pin 36. When the adjustment lever is moved rearwardly and adjustment pin 36 is placed in aperture 35b, the greatest amount of downward force acts upon packers 11. Conversely, when downward force adjustment lever 32 is moved forwardly, and a pin is inserted in aperture 35a, the least amount of downward force is exerted on packers 11.

When more or less downward force is applied to cultivator support arm 12, cultivator support arm 12 pivots downwardly or upwardly respectively about pivot point 37. At the opposite end of cultivator support arm 12 is an oblique support arm plate 38, shown in dotted lines in FIG. 2. This is adapted to fit within packer assembly connection bracket 39. When, as shown in FIG. 2, the packer assembly connection bracket is connected to oblique support arm plate 38, the connection bracket pin 40 is inserted. Packer assemblies P can be lifted on or off oblique support arm plate 38 by means of handle 41 when pin 40 is removed from aperture 44, as is shown in FIG. 3.

Packer assembly connection bracket 39 is equipped with an upper fixed projection 43, as shown in FIG. 3. This is adapted to fit over the uppermost portion of oblique plate 38. In operation the packer assemblies P are allowed to move upwardly and downwardly at either end when encountering uneven terrain or obstacles. This pivoting action takes place about horizontal pivot 42.

Figure 4:
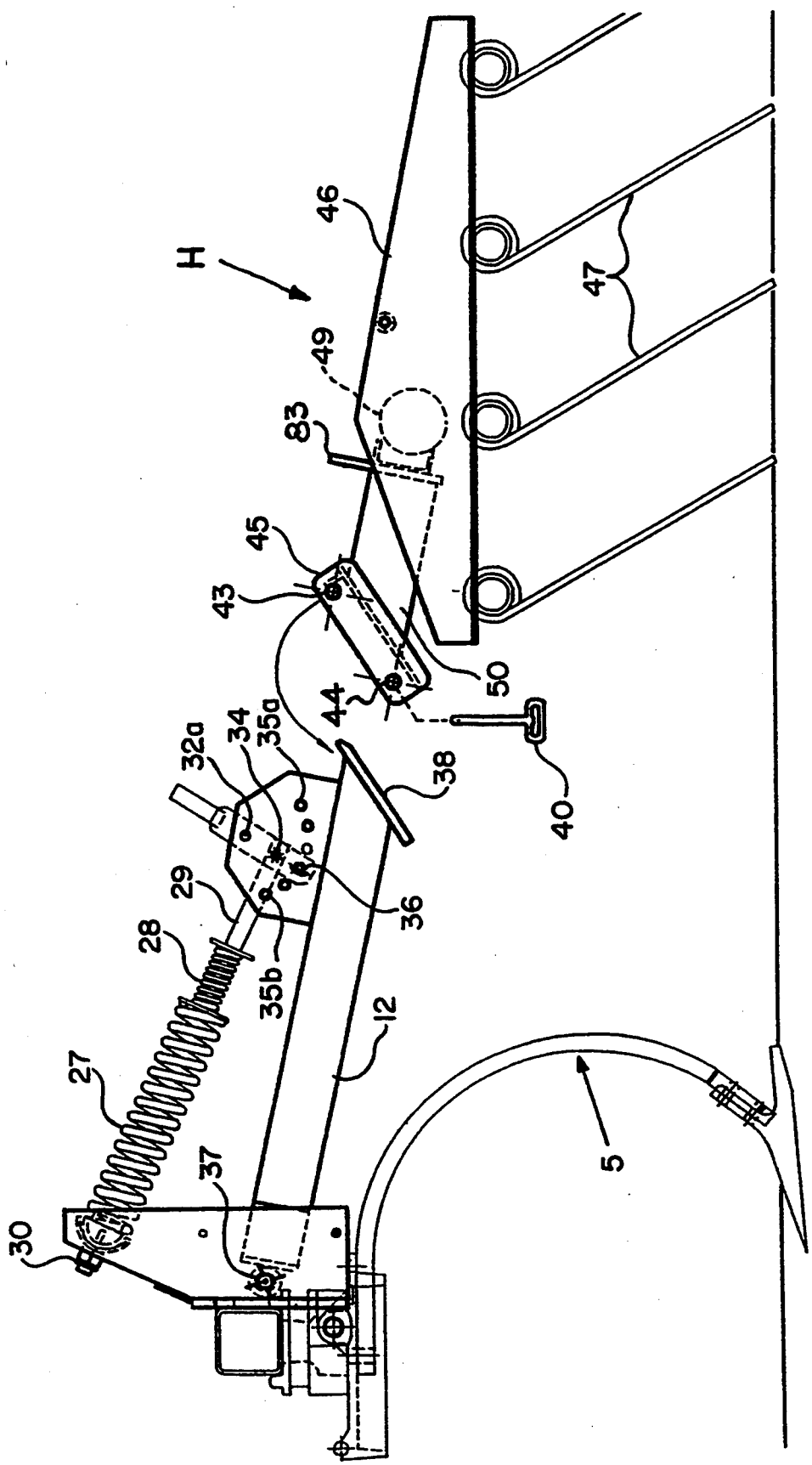
FIG. 4 is a side view of a detached harrow ready for mounting onto the cultivator.
Figure 5:
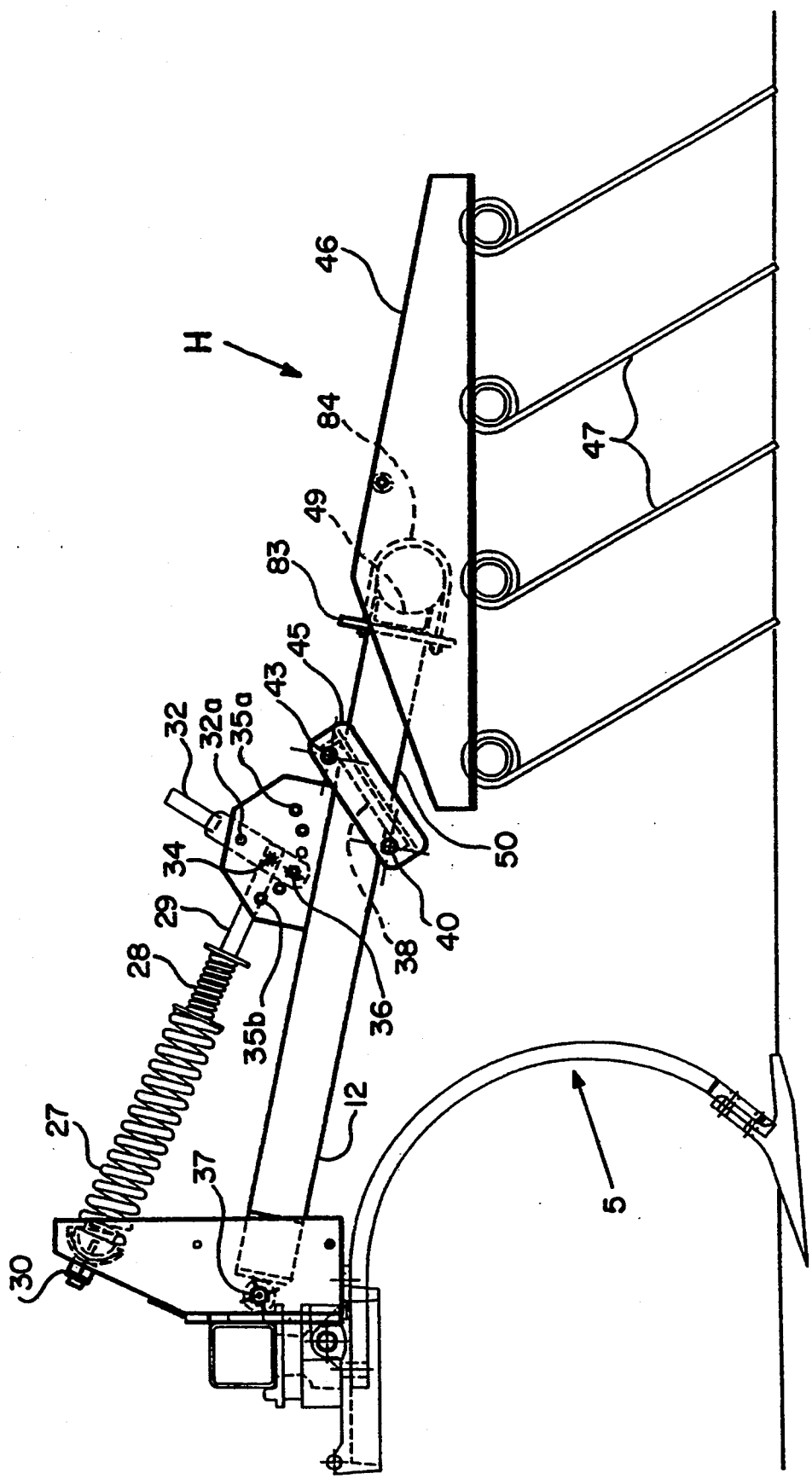
FIG. 5 is a side view of a harrow mounted on the cultivator.

When cultivator 1 is not being used for direct seeding the packer assemblies P are removed as shown in FIG. 3. Harrow assemblies H, as shown in FIGS. 4 and 5, are used as soil preparation implements, for seeding at a later time. The harrow assembly shown generally as H is in an unmounted position in FIG. 4 and in a mounted position in FIG. 5.

Packer assembly H is mounted to oblique support arm plate 38 by means of harrow assembly connection bracket 45. The bracket 45 is similar to packer assembly connection bracket 39. Harrow assembly connection bracket 45 has the same upper fixed projection 43 as does the packer assembly bracket 39. Similarly there is an aperture 44 adapted to receive pin 40.

Harrow assembly connection bracket 45 is fixedly connected to harrow assembly front support arm 50, which is connected to harrow frame cross member 49 (shown in dotted lines) by means of harrow assembly connection bracket backing plate 83 and U-bolts 84, as shown in FIG. 5 in dotted lines. Each side of harrow assembly H is comprised of a harrow frame member 46. The harrow assembly H also includes a plurality of spring tines 47.

Harrow assembly H is connected to oblique plate 38 on support arm 12 by placing connection bracket 45 with projection 43 over the oblique plate 38 and inserting pin 40 in aperture 44 as shown in FIG. 5.

Figure 6:
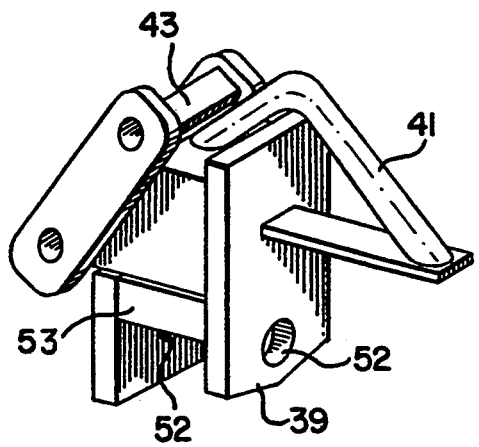
FIG. 6 is a perspective view of a mount bracket for a packer assembly.

FIG. 6 is a perspective view of the packer assembly connection bracket showing a resilient block 53 and apertures 52 which are adapted to receive horizontal pivot bolt 42 (shown in FIGS. 2 and 3).

Figure 7:
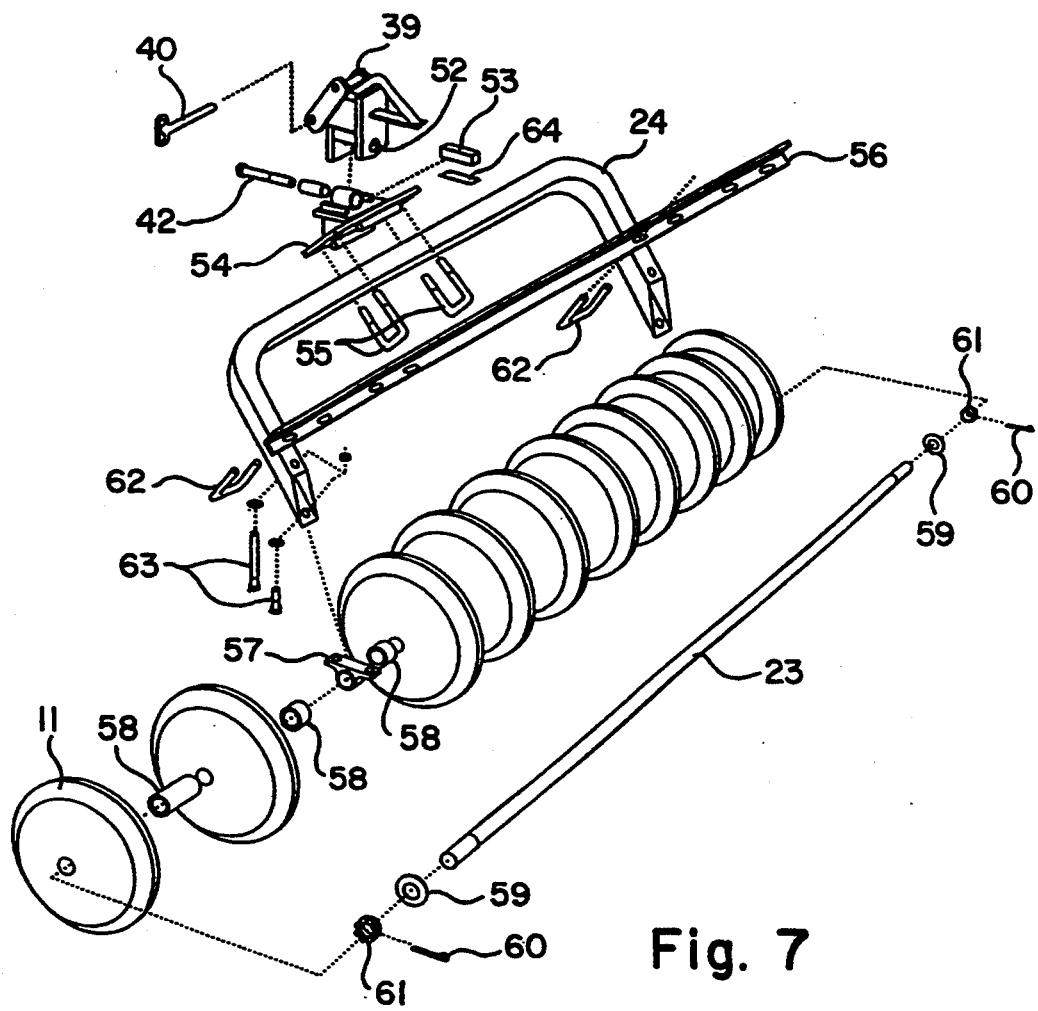
FIG. 7 is an exploded drawing of the packer assembly.

FIG. 7 is an exploded view in greater detail of a packer assembly. The resilient rubber block 53 is placed under packer assembly connection bracket 39. This block 53 keeps the packers "P" level regardless of the mounting position of the mounting bracket 45 on the packer assembly yoke 24. A packer wheel assembly bracket 54 is connected to yoke 24 by means of U-bolts 55. An optional packer wheel scraper bar 56 is shown in this particular drawing. Yoke 24 is pivotally connected to axle 23 by means of axle brackets 57. A plurality of spacers 58 are interposed between the packer wheels 11 along axle 23. At the end of each axle 23 is a washer 59, a nut 61 and cotter pin 60. U-bolts 62 attach scraper bar 56 to yoke 24. Bolts 63 connect axle brackets 57 to yoke 24. A shim 64 is located under resilient rubber block 53.

Figure 8:
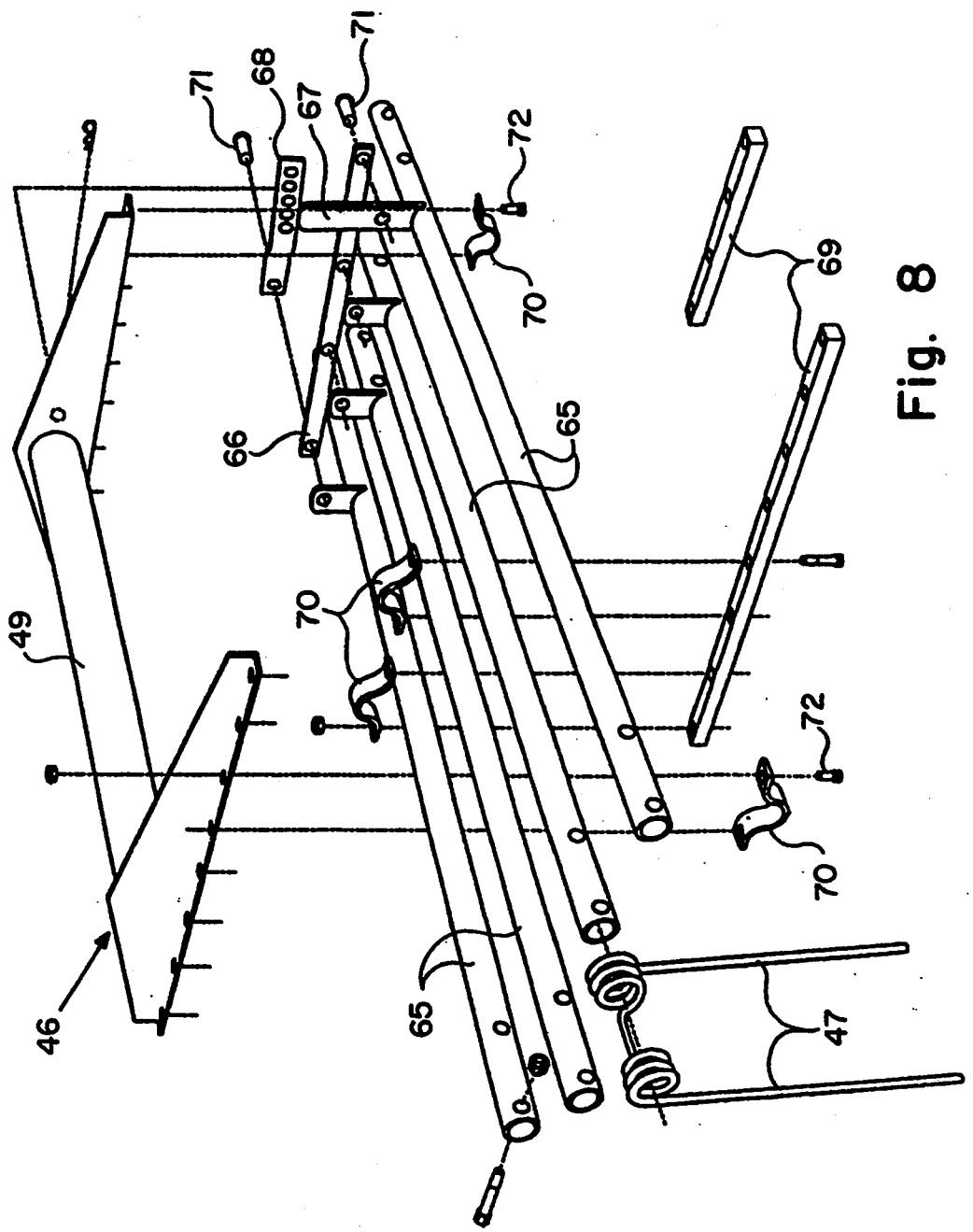
FIG. 8 is an exploded drawing of the harrow assembly.

FIG. 8 is a detailed exploded view of the harrow assembly of the present invention. Harrow assembly connection bracket 45 is not shown. The harrow assembly has four harrow tine cross bars 65 adapted to secure tines 47. A harrow link arm 66 is attached by bolts 71 to upwardly extending brackets welded on each of the harrow tine cross bars 65. A tine angle lever 67, fixedly connected to one of the harrow tine cross bars 65 is also adjustably connected to harrow pitch arm 68 by pin 71. The aforementioned linkage permits the angle of the harrow tines to be varied. Mounted below the harrow tine bars 65 are a pair of harrow reinforcing brackets 69 mounted by means of U-clamps 70.

Figure 9:
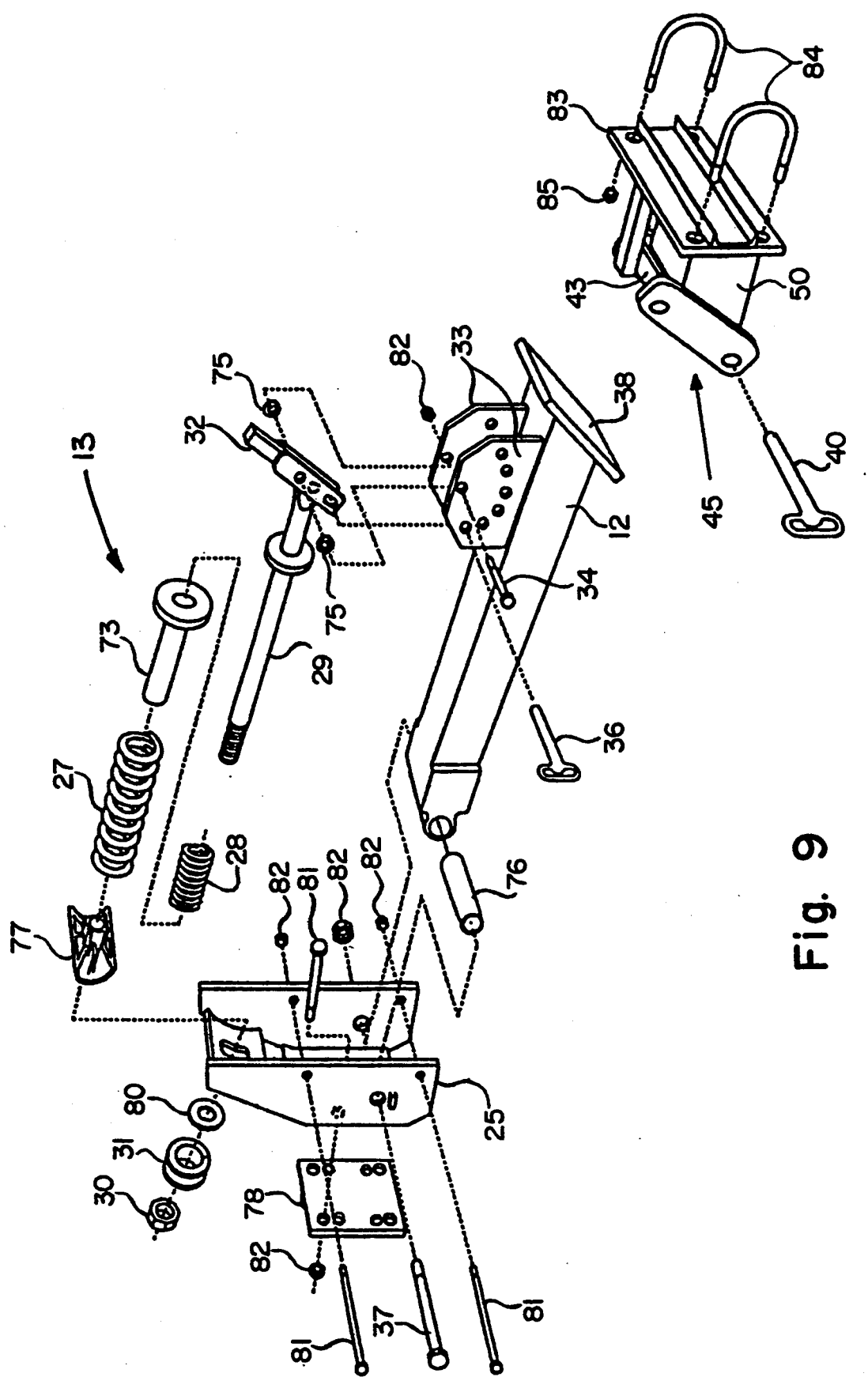
FIG. 9 is an exploded drawing of the spring tensioned cultivator support arm and the harrow assembly connection bracket.

FIG. 9 is a exploded detailed view of both the variable tension rate spring rod assembly, shown generally as 13, and the harrow assembly connection bracket 45. In order to retain spring 27 on rod 29, a spring arm stop 73 is used.

Pivot pin 34 is retained within adjustment bracket 33 and pivoted to adjustment lever 32 by means of washer 75 and nut 82. Pivot pin 37 which connects cultivator support arm 12 to bracket 25 passes through a nylon bushing 76.

A spring seat wear pad 77 seats large spring 27 within bracket 25. A backing plate 78 is interposed between bracket 25 and the rear frame member 26 of the cultivator 1 (not shown in FIG. 9). A washer 80 is placed between bracket 25, spacer 31 and spring rod retention nut 30 to secure variable tension rate spring rod 29 to bracket 25. Bolts 81 and nuts 82 provide stabilization to bracket 25 and cultivator support arm 12.

As previously mentioned, harrow assembly connection bracket 45, backing plate 83 and front support arm 50 are fixedly connected to cross beam 49 of the harrow assembly H by means of U-clamps 84 and nuts 85.

In order to operate the combination implement of the present invention in a manner suitable for cultivating only, the harrows H are connected by harrow assembly connection brackets 45 to oblique plate 38 and pin 40 is inserted through aperture 44. Thereafter a downward pressure adjustment lever 32 can be moved forwardly inserting pin 36 within aperture 35A. Thereafter the power source is activated and the cultivator 1 with attached harrows H is moved to the operating/tilling position.

When the operator desires to use the invention for direct seeding, the harrows H are detached by removing pin 40 and bracket 45 from plate 38. Thereafter, the cultivator is placed in position near the packer assemblies P and packer assembly connection bracket 39 is placed over oblique plate 38 and pin 40 inserted in aperture 44. Downward pressure adjustment lever 32 is moved rearwardly to increase the downward pressure on the packers. An air seeder 10 with fertilizer in bins 14 and seed in bins 15, is attached to the rear of the cultivator and the distribution lines 16, 20, 22 and manifolds 19, 21 carry seed to the seed boot 6. The power source is then activated.

In case of change of conditions in the field, the driver simply stops the combination implement and makes the desired changes to the cultivator height by activating cylinders 7. Thereafter the adjustment levers 32, located on each cultivator support arm 12 are moved and pin 36 placed in the desired aperture for a desired downward pressure.

Although a particular embodiment of the invention has been described, it is understood that any quick connect packer/harrow implement having a downward adjustment lever with springs of differing size or a single spring with varied pitch of the coils is within the scope of the present invention.

What I claim as my invention is:

1. A combination farm implement for seeding and tillage adapted to be pulled by a power source comprising:
   a cultivator including a plurality of furrow forming openers, said openers extending downwardly from a frame;
   said frame being supported by a plurality of wheels;
   said frame and said openers being adapted to be raised or lowered by hydraulic means;
   said cultivator further comprising a plurality of rearwardly extending support arms, each arm being pivotally mounted at a front end to a support bracket fixedly mounted to the rear of said frame;
   each of said support arms including a mounting plate at a rear end remote from said frame;
   each of said support brackets being adapted to fixedly retain a front end of a variable tension spring rod:
   said variable tension spring rod being pivotally connected at a rear end to an adjustment lever;
   said adjustment lever being pivotally mounted to an adjustment bracket;
   said adjustment bracket being fixedly mounted near said rear end of said support arm and comprising a plurality of spaced apart adjustment holes adapted to engage an adjustment pin;
   said implement further comprising a plurality of detachable soil working assemblies;
   each of said soil working assemblies including a mounting bracket;
   said mounting bracket including an upper downwardly extending projection and a lower aperture; wherein in operation, said projection is adapted to fit over and forward of the top of said mounting plate and said soil working assemblies are adapted to detachably connect and disconnect to said implement by insertion or removal, respectively, of a pin in said lower aperture of said mounting bracket:
   and wherein in a mounted position, downward pressure exerted upon said soil working assemblies can be increased or decreased by moving said adjustment lever rearwardly or forwardly, respectively, and inserting said adjustment pin in an appropriate one of said adjustment holes, in said adjustment bracket.

2. A combination farm implement as claimed in claim 1 wherein said soil working assemblies are packers.

3. A combination farm implement as claimed in claim 1 wherein said soil working assemblies are harrows.

4. A combination farm implement as claimed in claim 2 wherein in operation a movement of said adjustment lever varies the downward pressure transferred to said packers from 0.5 pounds per square inch to 3.5 pounds per square inch.

5. A combination farm implement as claimed in claim 1 wherein said variable tension rate spring rod includes two springs of different sizes directly aligned with one another on said rod; wherein in operation a smaller spring will deflect until compressed, and thereafter a larger spring will continue to deflect at a greater force.

6. A combination farm implement as claimed in claim 1 wherein said variable tension rate spring rod includes a single spring equipped with coils of different pitch.

7. A combination farm implement as claimed in claim 5 wherein a first spring has a force of 400 pounds per square inch and a second spring has a force of 500 pounds per square inch; wherein in operation the effective force exerted by said two springs is 222 pounds per square inch until said smaller spring becomes compressed, and thereafter the force exerted is 500 pounds per square inch.

8. A combination farm implement for seeding and tillage adapted to be pulled by a power source comprising:
   a cultivator including a plurality of furrow forming openers, said openers extending downwardly from a frame:
   said frame being supported by a plurality of wheels;
   said frame and said openers being adapted to be raised or lowered by hydraulic means;
   said cultivator further comprising a plurality of rearwardly extending support arms, each arm being pivotally mounted at a front end to a support bracket fixedly mounted to the rear of said frame:
   each of said support arms including a mounting plate at a rear end remote from said frame;
   each of said support brackets being adapted to fixedly retain a front end of a variable tension spring rod;
   said variable tension spring rod being pivotally connected at a rear end to an adjustment lever;
   said adjustment lever being pivotally mounted to an adjustment bracket:
   said adjustment bracket being fixedly mounted near said rear end of said support arm and comprising a plurality of spaced apart adjustment holes adapted to engage an adjustment pin;
   said implement further comprising a plurality of detachable soil working assemblies;
   each of said soil working assemblies including a mounting bracket;
   said mounting bracket including an upper downwardly extending projection and a lower aperture; wherein in operation, said projection is adapted to fit over and forward of the top of said mounting plate and said soil working assemblies are adapted to detachably connect and disconnect to said implement by insertion or removal, respectively, of a pin in said lower aperture of said mounting bracket:
   and wherein in a mounted position, downward pressure exerted upon said soil working assemblies can be increased or decreased by moving said adjustment lever rearwardly or forwardly, respectively, and inserting said adjustment pin in an appropriate one of said adjustment holes, in said adjustment bracket;
   said farm implement further including an air seeder;
   said air seeder being adapted to carry seed and fertilizer and be towed behind said cultivator, and further including a plurality of seed and fertilizer supply lines and a plurality of seed and fertilizer distribution manifolds;
   said supply lines and manifolds being adapted to move seed and fertilizer under pneumatic pressure to seed boots located behind said openers for distribution in furrows created by said furrow forming openers; and said seeds being pressed into the ground by said packers.

9. A combination farm implement as claimed in claim 8 wherein said soil working assemblies are packers.

10. A combination farm implement as claimed in claim 8 wherein said soil working assemblies are harrows.

11. A combination farm implement as claimed in claim 8 wherein said variable tension rate spring rod includes two springs of different sizes directly aligned with one another on said rod; wherein in operation a smaller spring will deflect until compressed, and thereafter a larger spring will continue to deflect at a greater force.

12. A combination farm implement as claimed in claim 11 wherein a first spring has a force of 400 pounds per square inch and a second spring has a force of 500 pounds per square inch; wherein in operation the effective force exerted by said two springs is 222 pounds per square inch until said smaller spring becomes compressed, and thereafter the force exerted is 500 pounds per square inch.

13. A combination farm implement as claimed in claim 8 wherein said variable tension rate spring rod includes a single spring equipped with coils of different pitch.

14. A combination farm implement as claimed in claim 8 wherein in operation a movement of said adjustment lever varies the downward pressure transferred to said packers from 0.5 pounds per square inch to 3.5 pounds per square inch.

15. A combination farm implement for seeding and tillage adapted to be pulled by a power source comprising:

a cultivator including a plurality of furrow forming openers, said openers extending downwardly from a frame;

said frame being supported by a plurality of wheels;

said frame and said openers being adapted to be raised or lowered by hydraulic means;

said cultivator further comprising a plurality of rearwardly extending support arms, each arm being pivotally mounted at a front end to a support bracket fixedly mounted to the rear of said frame;

each of said support arms including a mounting plate at a rear end remote from said frame;

each of said support brackets being adapted to fixedly retain a front end of a variable tension spring rod;

said variable tension spring rod being pivotally connected at a rear end to an adjustment lever;

said adjustment lever being pivotally mounted to an adjustment bracket;

said adjustment bracket being fixedly mounted near said rear end of said support arm and comprising a plurality of spaced apart adjustment holes adapted to engage an adjustment pin;

said implement further comprising a plurality of detachable packers;

each of said soil working assemblies including a mounting bracket;

said mounting bracket including an upper downwardly extending projection and a lower aperture; wherein in operation, said projection is adapted to fit over and forward of the top of said mounting plate and said soil working assemblies are adapted to detachably connect and disconnect to said implement by insertion or removal, respectively, of a pin in said lower aperture of said mounting bracket;

and wherein in a mounted position, downward pressure exerted upon said soil working assemblies can be increased or decreased by moving said adjustment lever rearwardly or forwardly, respectively, and inserting said adjustment pin in an appropriate one of said adjustment holes, in said adjustment bracket;

said mounting brackets further including resilient blocks whereby said packers are maintained in a level position regardless of the mounting position of said mounting bracket on a frame of said packer.

16. A combination farm implement as claimed in claim 15 wherein said variable tension rate spring rod includes two springs of different sizes directly aligned with one another on said rod; wherein in operation a smaller spring will deflect until compressed, and thereafter a larger spring will continue to deflect at a greater force.

17. A combination farm implement as claimed in claim 15 wherein said variable tension rate spring rod includes a single spring equipped with coils of different pitch.

18. A combination farm implement for seeding and tillage adapted to be pulled by a power source comprising:

a cultivator including a plurality of furrow forming openers, said openers extending downwardly from a frame:

said frame being supported by a plurality of wheels;

said frame and said openers being adapted to be raised or lowered by hydraulic means;

said cultivator further comprising a plurality of rearwardly extending support arms, each arm being pivotally mounted at a front end to a support bracket fixedly mounted to the rear of said frame;

each of said support arms including a mounting plate at a rear end remote from said frame;

each of said support brackets being adapted to fixedly retain a front end of a variable tension spring rod;

said variable tension spring rod being pivotally connected at a rear end to an adjustment lever;

said adjustment lever being pivotally mounted to an adjustment bracket:

said adjustment bracket being fixedly mounted near said rear end of said support arm and comprising a plurality of spaced apart adjustment holes adapted to engage an adjustment pin;

said implement further comprising a plurality of detachable packers;

each of said soil working assemblies including a mounting bracket:

said mounting bracket including an upper downwardly extending projection and a lower aperture; wherein in operation, said projection is adapted to fit over and forward of the top of said mounting plate and said soil working assemblies are adapted to detachably connect and disconnect to said implement by insertion or removal, respectively, of a pin in said lower aperture of said mounting bracket;

and wherein in a mounted position, downward pressure exerted upon said soil working assemblies can be increased or decreased by moving said adjustment lever rearwardly or forwardly, respectively, and inserting said adjustment pin in an appropriate one of said adjustment holes, in said adjustment bracket;

said farm implement including a spacer block mounted on the front end of said variable tension rate spring rod between a retaining nut and said support bracket, such that in operation, said packers are sufficiently raised for road transport.

19. A combination farm implement as claimed in claim 18 wherein said variable tension rate spring rod includes two springs of different sizes directly aligned with one another on said rod; wherein in operation a smaller spring will deflect until compressed, and thereafter a larger spring will continue to deflect at a greater force.

20. A combination farm implement as claimed in claim 18 wherein said variable tension rate spring rod includes a single spring equipped with coils of different pitch.

* * * * *